(12) United States Patent
Ramasamy et al.

(10) Patent No.: US 10,858,568 B1
(45) Date of Patent: Dec. 8, 2020

(54) RHEOLOGY MODIFIER FOR ORGANOCLAY-FREE INVERT EMULSION DRILLING FLUID SYSTEMS

(71) Applicant: Saudi Arabian Oil Company, Dhahran (SA)

(72) Inventors: Jothibasu Ramasamy, Dhahran (SA); Vikrant Wagle, Abqaiq (SA); Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/508,886

(22) Filed: Jul. 11, 2019

(51) Int. Cl.
*C09K 8/36* (2006.01)
*E21B 21/00* (2006.01)

(52) U.S. Cl.
CPC ............... *C09K 8/36* (2013.01); *E21B 21/00* (2013.01)

(58) Field of Classification Search
None
See application file for complete search history.

(56) References Cited

U.S. PATENT DOCUMENTS

| | | | |
|---|---|---|---|
| 3,966,632 A | 6/1976 | Colliopoulos et al. | |
| 5,718,747 A | 2/1998 | Okusawa | |
| 7,008,474 B2 | 3/2006 | Konno et al. | |
| 8,563,482 B2 | 10/2013 | Amanullah | |
| 8,936,111 B2 | 1/2015 | Maghrabi et al. | |
| 9,127,192 B2 | 9/2015 | Maghrabi et al. | |
| 9,346,995 B2 | 5/2016 | Wagle et al. | |
| 9,469,803 B2 | 10/2016 | Wagle et al. | |
| 9,988,569 B2 | 6/2018 | Wagle et al. | |
| 10,030,189 B2 | 7/2018 | Wagle et al. | |
| 2004/0002427 A1 | 1/2004 | Goncalves et al. | |
| 2011/0214864 A1* | 9/2011 | Maghrabi ............... E21B 43/16 166/294 |

(Continued)

FOREIGN PATENT DOCUMENTS

| | | |
|---|---|---|
| CN | 1318427 A | 10/2001 |
| CN | 102286273 A | 12/2011 |

(Continued)

OTHER PUBLICATIONS

RHEMOD™ L Material Safety Data Sheet; Halliburton; 2014. (Year: 2014).*

(Continued)

*Primary Examiner* — Andrew Sue-Ako
(74) *Attorney, Agent, or Firm* — Bracewell LLP; Constance G. Rhebergen; Brian H. Tompkins (57) ABSTRACT

Invert emulsion drilling fluids having a combination of fatty acids derived from waste vegetable oil (WVO) and a fatty amine as a rheology modifier are provided. An invert emulsion drilling fluid may include a water in oil emulsion, an invert emulsifier, a fatty amine having six to thirty carbon atoms, and a fatty acid having six to eighteen carbon atoms. The fatty acid is provided by esterifying a waste vegetable oil to produce a methyl ester of the waste vegetable oil and cleaving an ester group from the methyl ester of the waste vegetable oil. The invert emulsion drilling fluid may be formulated free of organoclay. Methods of drilling a wellbore using an invert emulsion drilling fluid are also provided.

16 Claims, 3 Drawing Sheets

(56) References Cited

U.S. PATENT DOCUMENTS

| | | | |
|---|---|---|---|
| 2012/0165231 A1* | 6/2012 | Miller | C09K 8/03 |
| | | | 507/143 |
| 2013/0210630 A1 | 8/2013 | Musa et al. | |
| 2013/0303410 A1 | 11/2013 | Wagle et al. | |
| 2013/0303411 A1 | 11/2013 | Wagle et al. | |
| 2015/0024975 A1 | 1/2015 | Wagle et al. | |
| 2016/0230070 A1 | 8/2016 | Wagle et al. | |
| 2016/0298015 A1 | 10/2016 | Gupta et al. | |
| 2017/0292056 A1 | 10/2017 | Wagle et al. | |
| 2018/0148625 A1 | 5/2018 | Wagle et al. | |
| 2018/0148626 A1 | 5/2018 | Wagle et al. | |
| 2018/0179431 A1 | 6/2018 | Bao et al. | |
| 2018/0265762 A1 | 9/2018 | Nehete et al. | |
| 2019/0031940 A1 | 1/2019 | Ramasamy et al. | |

FOREIGN PATENT DOCUMENTS

| | | |
|---|---|---|
| RU | 2336291 C1 | 10/2008 |
| RU | 2652378 C1 | 4/2018 |
| WO | 2002062920 A1 | 8/2002 |
| WO | 2013078374 A1 | 5/2013 |
| WO | 2014164381 A1 | 10/2014 |
| WO | 2015006101 A1 | 1/2015 |

OTHER PUBLICATIONS

International Search Report and Written Opinion for International Application No. PCT/US2018/043675 report dated Oct. 9, 2018; pp. 1-12.

Sharoba, Ashraf M. et al.; "Impact of Frying on Fatty Acid Profile and Rheological Behaviour of Some Vegetable Oils" Journal of Food Processing & Technology, vol. 3, Issue 7, 2012; pp. 1-9.

International Search Report and Written Opinion for International Application No. PCT/US2020/041639; dated Oct. 8, 2020; pp. 1-15.

* cited by examiner

RHEOLOGY MODIFIER FOR ORGANOCLAY-FREE INVERT EMULSION DRILLING FLUID SYSTEMS

BACKGROUND

Field of the Disclosure

The present disclosure generally relates to drilling fluids for oil and gas exploration.

Description of the Related Art

Oil and gas drilling operations use drilling fluids to assist in drilling and perform a variety of functions during such operations. Conventional invert emulsion drilling fluids use organophilic clays (also referred to as "organoclays") as a primary viscosifier. While conventional thickeners like organophilic clay may provide a desired drilling fluid rheology of the drilling fluid, organophilic clays may degrade over time and fail to maintain the rheology of the fluid.

SUMMARY

Degradation of organophilic clay rheology modifiers may be addressed by the addition of excessive organophilic clay to the drilling fluid or by the addition of excessive low gravity solids (LGS). However, the use of excessive organophilic clay increases the cost of drilling and may severely impact other drilling fluid properties, thus requiring further treatment and increased cost. The use of LGS may increase the plastic viscosity and solids volume percentage of the drilling fluid, thus impacting the rate of penetration and increasing the cost of drilling.

Additionally, the changes in drilling fluid rheology that occur in response to changes in pressure and temperature at increased well depths may cause changes in the equivalent circulating density (ECD) while drilling. During operation in a narrow window of pore pressure and fracture gradient, such changes in ECD may lead to fracturing of the formation and result in formation damage and mud losses that increase drilling costs. In some instances, thinner drilling fluids may be used to generally minimize rheology fluctuations that may lower ECDs; however, such fluids may not maintain a drilling fluid rheology sufficient to remove cuttings and aid in the suspension of drill solids.

Embodiments of the disclosure include invert emulsion drilling fluids having a combination of fatty acids derived from waste vegetable oil (WVO) and a fatty amine as a rheology modifier. The invert emulsion drilling fluids may be formulated free of organoclay or may include organoclay.

In one embodiment, an invert emulsion drilling fluid is provided that includes a water in oil emulsion, an invert emulsifier to stabilize the water in oil emulsion in an amount operable to stabilize the water in oil emulsion, a fatty amine having six to thirty six carbons, and a fatty acid having six to eighteen carbons. The fatty acid is produced by esterifying a waste vegetable oil to produce a methyl ester of the waste vegetable oil and cleaving an ester group from the methyl ester of the waste vegetable oil.

In some embodiments, the invert emulsion drilling fluid includes a filtration control agent, lime, calcium chloride, and barite. In some embodiments, the invert emulsion drilling fluid consists of the water in oil emulsion, the invert emulsifier to stabilize the water in oil emulsion in an amount operable to stabilize the water in oil emulsion, the fatty amine having six to thirty six carbons, the fatty acid having six to eighteen carbons, the filtration control agent, lime, calcium chloride, and barite. In some embodiment, the filtration control agent is an amount in the range of 0.1 pounds-per-barrel (ppb) to 15 ppb. In some embodiments, the lime is an amount in the range of 0.1 pounds-per-barrel (ppb) to 20 ppb. In some embodiments, the calcium chloride is an amount in the range of 0.1 pounds-per-barrel (ppb) to 300 ppb. In some embodiments, the barite is an amount in the range of 0.1 pounds-per-barrel (ppb) to 800 ppb. In some embodiments, the fatty amine is a C36 fatty dimer diamine. In some embodiments, the fatty acid having six to eighteen carbons is a mixture of saturated fatty acids and unsaturated fatty acids. In some embodiments, the invert emulsion drilling fluid does not include clay. In some embodiments, the invert emulsion drilling fluid has an oil to water ratio (OWR) in the range of 50:50 to 90:10. In some embodiments, oil is selected from the group consisting of mineral oil, diesel fuel, and synthetic oil, and combinations thereof. In some embodiments, the fatty amine having six to thirty six carbons is an amount in the range of 0.1 pounds-per-barrel (ppb) to 30 ppb. In some embodiments, the fatty acid having six to eighteen carbons is an amount in the range of 0.1 pounds-per-barrel (ppb) to 30 ppb. In some embodiments, the invert emulsifier is an amount in the range of 0.1 pounds-per-barrel (ppb) to 30 ppb. In some embodiments, the invert emulsion drilling fluid has a yield point of at least 50 pounds/feet squared (lb/ft$^2$).

In another embodiment, a method of drilling a wellbore using an invert emulsion drilling fluid is provided. The method includes drilling in a formation using an invert emulsion drilling fluid. The invert emulsion drilling fluid includes a water in oil emulsion, an invert emulsifier to stabilize the water in oil emulsion in an amount operable to stabilize the water in oil emulsion, a fatty amine having six to thirty six carbons, and a fatty acid having six to eighteen carbons. The fatty acid is produced by esterifying a waste vegetable oil to produce a methyl ester of the waste vegetable oil and cleaving an ester group from the methyl ester of the waste vegetable oil. In some embodiments, the invert emulsion drilling fluid includes a filtration control agent, lime, calcium chloride, and barite. In some embodiments, the invert emulsion drilling fluid consists of the water in oil emulsion, the invert emulsifier to stabilize the water in oil emulsion in an amount operable to stabilize the water in oil emulsion, the fatty amine having six to thirty six carbons, the fatty acid having six to eighteen carbons, the filtration control agent, lime, calcium chloride, and barite. In some embodiment, the filtration control agent is an amount in the range of 0.1 pounds-per-barrel (ppb) to 15 ppb. In some embodiments, the lime is an amount in the range of 0.1 pounds-per-barrel (ppb) to 20 ppb. In some embodiments, the calcium chloride is an amount in the range of 0.1 pounds-per-barrel (ppb) to 300 ppb. In some embodiments, the barite is an amount in the range of 0.1 pounds-per-barrel (ppb) to 800 ppb. In some embodiments, the fatty amine us a C36 fatty dimer diamine. In some embodiments, the fatty acid having six to eighteen carbons is a mixture of saturated fatty acids and unsaturated fatty acids. In some embodiments, the invert emulsion drilling fluid does not include clay. In some embodiments, the invert emulsion drilling fluid has an oil to water ratio (OWR) in the range of 50:50 to 90:10. In some embodiments, oil is selected from the group consisting of mineral oil, diesel fuel, and synthetic oil, and combinations thereof. In some embodiments, the fatty amine having six to thirty six carbons is an amount in the range of 0.1 pounds-per-barrel (ppb) to 30 ppb. In some embodiments, the fatty acid having six to eighteen carbons is an amount in the range of 0.1 pounds-per-barrel (ppb) to 30 ppb. In some embodiments, the invert emulsifier is an amount in the range of 0.1 pounds-per-barrel (ppb) to 30 ppb. In some embodiments, the invert emulsion drilling fluid has a yield point of at least 50 pounds/feet squared (lb/ft$^2$).

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As used in the disclosure, when an invert emulsion fluid is "free" of a component, the amount of that component present in the composition is such that it will not impair the activity of the invert emulsion fluids and will confer the advantages as described in a particular embodiment. For example, if an invert emulsion fluid is said to be free of clay, then the concentration of clay in the invert emulsion fluid, as determined by a statistically significant quantitative evaluation, is less than 5%.

Embodiments of the disclosure include invert emulsion drilling fluids having a combination of fatty acids derived from waste vegetable oil (WVO) and a fatty amine as a rheology modifier. The combination of fatty acids derived from waste vegetable oil (WVO) and fatty amines may increase the yield point (YP) and low shear yield point (LSYP) of the fluid thereby increasing the hole-cleaning capacity and barite sag resistance of the fluid. Embodiments of the invert emulsion drilling fluids may also include a water in oil emulsion, an invert emulsifier, a filtration control additive, a weighting additive, lime, and calcium chloride.

In some embodiments, the invert emulsion drilling fluid is an organoclay-free invert emulsion drilling fluid. In some embodiments, the organoclay-free invert emulsion drilling fluid may consist of a water in oil emulsion, an invert emulsifier, a filtration control additive, a weighting additive, lime, a salt (for example, calcium chloride), and water without any other components. In other embodiments, the invert emulsion drilling fluid may include an organoclay. In some embodiments, the invert emulsion drilling fluid does not include low gravity solids.

In some embodiments, the invert emulsion drilling fluid may be formulated to have a plastic viscosity of no more than 40 centiPoise (cP). In some embodiments, the invert emulsion drilling fluid may be formulated to have a yield point of at least 50 pounds/100 feet squared (lb/100 ft$^2$). In some embodiments, the invert emulsion drilling fluid may be formulated to have a low shear yield point of at least 22 lb/100 ft$^2$.

In some embodiments, the invert emulsion drilling fluid may be formulated to have an oil to water ratio (OWR) in the range of about 50:50 to about 90:10. In some embodiments, the invert emulsion drilling fluid may have an OWR of about 70:30. In some embodiments, the oil may be selected from the group consisting of mineral oil, diesel fuel, and synthetic oil (that is, an oil consisting of artificially manufactured chemical compounds), and may include combinations thereof. In some amounts, the invert emulsion drilling fluid includes water in an amount in the range of about 1 pounds-per-barrel (ppb) to about 200 ppb, about 10 ppb to about 100 ppb, or 20 ppb to about 80 ppb. In some embodiments, the invert emulsion drilling fluid includes water in an amount of about 29.6 ppb.

In some embodiments, the invert emulsion drilling fluid includes the invert emulsifier in an amount in the range of about 0.1 ppb to about 30 ppb, about 1 ppb to about 20 ppb, or about 2 ppb to 12 ppb. In some embodiments, the invert emulsion drilling fluid includes the invert emulsifier in an amount of 10 ppb. In some embodiments, the invert emulsifier may be LE SUPERMUL™ manufactured by Halliburton Company of Houston, Tex., USA.

In some embodiments, the invert emulsion drilling fluid includes the filtration control additive in an amount in the range of about 0.1 ppb to about 15 ppb, about 0.5 ppb to 10 ppb, or about 1 ppb to about 5 ppb. In some embodiments, the invert emulsion drilling fluid includes the filtration control additive in an amount of about 2 ppb. In some embodiments, the filtration control additive is ADAPTA® manufactured by Halliburton Company of Houston, Tex., USA.

In some embodiments, the invert emulsion drilling fluid includes lime in an amount in the range of about 0.1 ppb to about 20 ppb, about 0.5 ppb to about 10 ppb, or about 1 ppb to about 5 ppb. In some embodiments, the invert emulsion drilling fluid includes lime in an amount of about 1.5 ppb.

In some embodiments, the invert emulsion drilling fluid includes calcium chloride ($CaCl_2$)) in an amount in the range of about 1 ppb to about 300 ppb, or about 10 ppb to about 200 ppb, or about 20 ppb to about 80 ppb. In some embodiments, the invert emulsion drilling fluid includes calcium chloride ($CaCl_2$)) in an amount of about 29.6 ppb.

In some embodiments, the invert emulsion drilling fluid includes a weighting additive (for example, barite) in an amount in the range of about 1 ppb to about 800 ppb or about 100 ppb to about 250 ppb. In some embodiments, the invert emulsion drilling fluid includes a weighting additive in an amount of about 223.7 ppb. In some embodiments, the weighting additive is BAROID® manufactured by Halliburton Company of Houston, Tex., USA.

In some embodiments, the invert emulsion drilling fluid may be formulated to have a mud weight in the range of about 65 pounds-per-cubic foot (pcf) to 160 pcf. In some embodiments, invert emulsion drilling fluid may have a mud weight of about 90 (pcf).

The fatty amine is a C6 to C36 amine or any combination thereof (that is, any combinations of a C6 amine, C7 amine, C8 amine, C9 amine, C10 amine and so on up to a C36 amine). In some embodiments, the invert emulsion drilling fluid includes a fatty amine in the range of about 0.1 ppb to about 30 ppb, 0.5 ppb to 20 ppb, or 1 ppb to 10 ppb. In some embodiments, the invert emulsion drilling fluid includes a fatty amine in an amount of about 1.5 ppb. In some embodiments, the fatty amine is a C36 fatty dimer diamine. In some embodiments, the fatty amine is Priamine™ 1074 manufactured by Croda International Plc of East Yorkshire, UK.

The fatty acids derived from waste vegetable oil (WVO) are produced from the base hydrolysis of a fatty acid methyl ester derived from waste vegetable oil, as described in U.S. Patent Application Publication No. 2019/0031940 titled "ECOFRIENDLY EMULSIFIER SYNTHESIS FROM ESTERIFIED WASTE VEGETABLE OIL FOR WELLBORE DRILLING FLUIDS," a copy of which is incorporated by reference for the purposes of United States patent practice. The waste vegetable oil may include a variety of cooking oils and may be obtained from commercial eateries and food preparation operations (for example, as waste oil from restaurants). The fatty acids derived from waste vegetable oil (WVO) may include fatty acids having 6 carbon atoms (C6) to 18 carbon atoms (C18). In some embodiments, the invert emulsion drilling fluid includes fatty acids derived from waste vegetable oil (WVO) in the range of about 0.1 ppb to about 30 ppb, 0.5 ppb to 20 ppb, or 1 ppb to 10 ppb. In some embodiments, the invert emulsion drilling fluid includes a fatty amine in an amount of about 1.5 ppb. The fatty acids derived from waste vegetable oil may be produced by esterifying a waste vegetable oil to produce a methyl ester of the waste vegetable oil and cleaving an ester group from the methyl ester of the waste vegetable oil. The production of the fatty acid from the fatty acid methyl ester and the production of the fatty acid methyl ester from WVO are illustrated in FIGS. 1 and 2 respectively.

Figure 1:
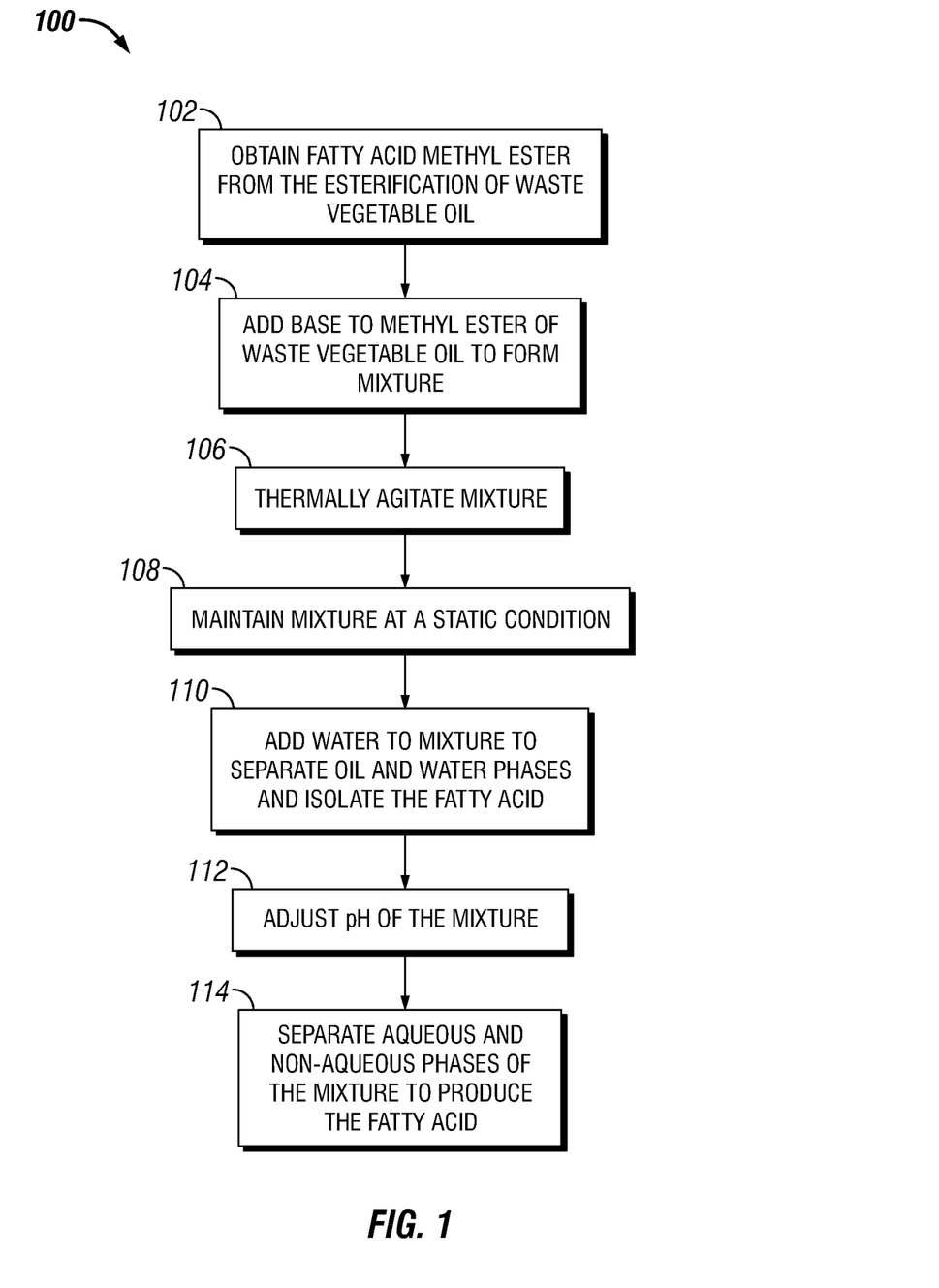
FIG. 1 is flowchart of a process for producing a fatty acid from the base hydrolysis of a fatty acid methyl ester derived from waste vegetable oil (WVO) for use in an invert emulsion drilling fluid in accordance with an embodiment of the disclosure.
Figure 2:
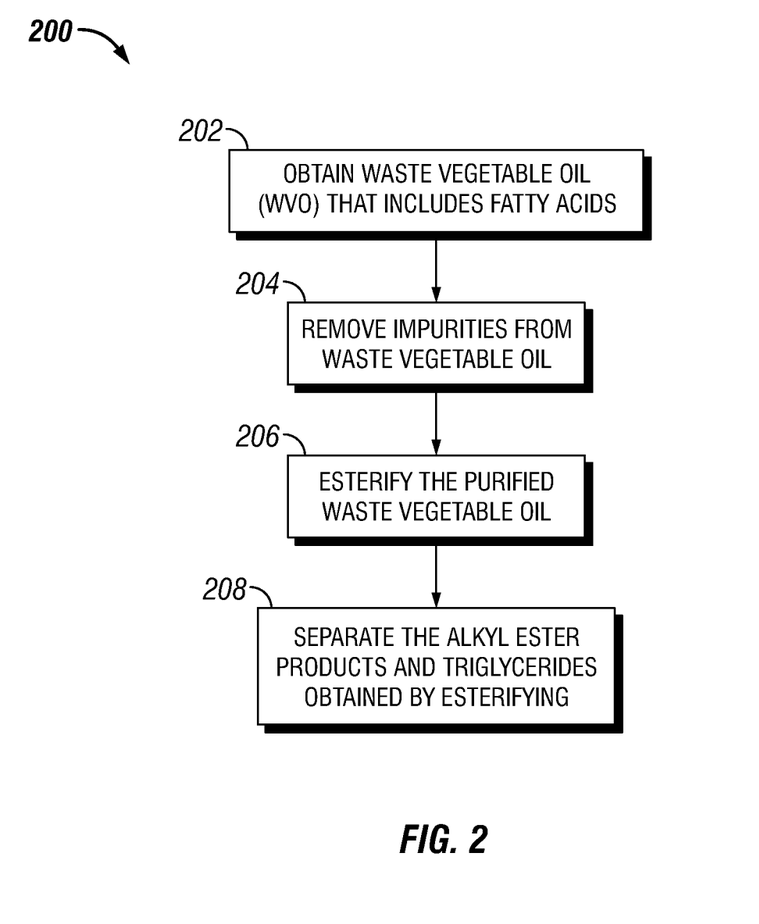
FIG. 2 is a flowchart of a process for producing alkyl esters from waste vegetable oil in accordance with an embodiment of the disclosure.

FIG. 1 is a flowchart of an example process 100 for producing a fatty acid from the base hydrolysis of a fatty acid methyl ester derived from waste vegetable oil (WVO) for use in the invert emulsion drilling fluid in accordance with an embodiment of the disclosure. Initially, a fatty acid methyl ester from the esterification of waste vegetable oil is obtained (block 102). For example, waste vegetable oil may be esterified to prepare a methyl ester of the vegetable oil fatty acids and the derivatives thereof found in waste vegetable oil.

Next, a base (for example, a sodium hydroxide solution) may be added to the methyl ester of the waste vegetable oil (block 104) to form a mixture. In other embodiments, other alkali hydroxide solutions may be used as the base. In some embodiments, the base may be added to the methyl ester of the waste vegetable oil over a period of time. In some embodiments, the base may added at a rate selected to minimize the formation of a suspension that may hinder the base hydrolysis reaction of the methyl ester. For example, in some embodiments, the base may be added at a rate of about 1 milliliter (ml) per minute).

The mixture may then be thermally agitated (block 106). In some embodiments, the mixture may be stirred (or otherwise agitated) for a time period greater than 6 hours at a temperature greater than room temperature. As will be appreciated, the agitation may facilitate and increase contact between the base and the methyl ester, while the heating may create Brownian motion of the reaction mixture and accelerate the reaction kinetics.

After thermal agitation, the mixture may be maintained at a static condition (block 108). In some embodiments, the mixture may be allowed to cool to room temperature after agitation and heating. As used in the disclosure, the term "static condition" refers to no agitation or other action performed on the mixture. As will be appreciated, maintaining the mixture at the static condition may allow the methyl groups to be cleaved off to produce the fatty acid. Next, water may be added to the mixture to separate oil and water phases and isolate the fatty acid (block 110). In some embodiments, the water volume may be in the range of about 15% to about 10% of the oil volume initially used for the reaction.

The pH of the mixture may be adjusted (block 112). In some embodiments, the pH is adjusted by adding an acid to the mixture until the pH of the mixture reaches a level at which an oil separates from the mixture.

Next, the aqueous and non-aqueous phases of the mixtures are separated (block 114) to produce the fatty acid present in the non-aqueous phase. In some embodiments, the phases may be separated by first transferring the mixture to a separation flask and removing the aqueous phase from the flask. In such embodiments, additional water may be added to the separation flask to wash and remove any remaining inorganic salts present in the non-aqueous phase. The remaining non-aqueous phase with the fatty acid may be left in a static condition to allow the fatty acid to defoam. Additional water producing during the de-foaming may be removed from the flask.

FIG. 2 depicts a process 200 for producing alkyl esters (that is, esterified waste vegetable oil) from waste vegetable oil in accordance with an embodiment of the disclosure. The esterified waste vegetable oil may be used to produce the fatty acid according to the process 100 described supra. Initially, waste vegetable oil that includes fatty acids is obtained (block 202). In some embodiments, the waste vegetable oil may have a plastic viscosity of greater than about 50 centipoise (cP) measured using a multi-speed rotational viscometer. In some embodiments, the waste vegetable oil may include fatty acids with a short chain alcohol. The short chain alcohol may include methanol, ethanol, propanol, butanol, or combinations thereof. The waste vegetable oil may include fatty acids having 12 carbon atoms (C12) to 18 carbon atoms (C18).

Next, impurities may be removed from the waste vegetable oil (block 204). The impurities may include food residue. In some embodiments, the impurities may be removed by filtering the waste vegetable oil. In some embodiments, the waste vegetable oil may be filtered using filter paper having a pore size less than 5 microns at a pressure in the range of about 5 pounds per square inch (psi) to 10 psi. In other embodiments, impurities may be removed from the waste vegetable oil using alternative or additional techniques.

The purified waste vegetable oil may then be esterified (block 206). In some embodiments, the waste vegetable oil is esterified in the presence of a catalyst to produce alkyl ester (for example, methyl ester) products and triglycerides. In some embodiments, the catalyst may be sodium hydroxide, potassium hydroxide, sodium alkoxide, potassium alkoxide, or combinations thereof.

In some embodiments, the viscosity of the waste vegetable oil may be reduced to match the viscosity of mineral oil (about 12 cP) by adding methanol. In such embodiments, methanol and the catalyst (for example, sodium hydroxide) may be mixed and then added to the waste vegetable oil. The mixture may be agitated for a time period (for example, about 6 hours). Next, the alkyl ester products and triglycerides may be separated (block 208) to produce the alkyl esters (for example, methyl esters) for production of fatty acids from the base hydrolysis of the fatty acid methyl esters.

Embodiments also include a process for drilling a wellbore with an invert emulsion drilling fluid that includes drilling a formation using the invert emulsion drilling fluid. In some embodiments, the process includes drilling a formation using an organoclay-free invert emulsion drilling fluid. Advantageously, as mentioned supra, the combination of waste vegetable oil (WVO) and a fatty amine as a rheology modifier in the invert emulsion drilling fluid may provide a low end rheology that reduces barite sag and provides improved hole-cleaning capability. The waste vegetable oil (WVO) and a fatty acid combination rheology modifier may also provide an improved low end rheology for low and medium density organoclay-free invert emulsion drilling fluids. Additionally, the elimination of organoclay in the drilling fluid may minimize the effects of contamination such that any contamination may be easily treated using oil mud conditions in amounts that do not impair the performance of the drilling fluid.

Examples

The following examples are included to demonstrate embodiments of the disclosure. It should be appreciated by those of skill in the art that the techniques and compositions disclosed in the example that follows represents techniques and compositions discovered to function well in the practice of the disclosure, and thus can be considered to constitute modes for its practice. However, those of skill in the art should, in light of the present disclosure, appreciate that many changes can be made in the specific embodiments that are disclosed and still obtain a like or a similar result without departing from the spirit and scope of the disclosure.

Example organoclay-free invert emulsion drilling fluids were prepared having a mud weight of about 90 pounds-per-cubic foot (pcf), an oil-water ratio of about 70:30, and a calcium chloride (CaCl$_2$) water phase salinity (WPS) of about 250,000 parts-per-million (ppm). Some of the example organoclay-free invert emulsion drilling fluids were prepared using a commercially available C36 fatty dimer diamine, Priamine™ 1074, manufactured by Croda International Plc of East Yorkshire, UK.

Three example formulations of an organoclay-free invert emulation drilling fluid were prepared. Each example formulation included a mineral oil. available from Safra Company Limited, headquartered in Jeddah, Saudi Arabia, a commercially available emulsifier LE SUPERMUL™ manufactured by Halliburton Company of Houston, Tex., USA, a commercially available filtration control additive ADAPTA® manufactured by Halliburton Company of Houston, Tex., USA, and a weighting additive BAROID® manufactured by Halliburton Company of Houston, Tex., USA.

A first fluid ("Fluid 1") was formulated using Priamine 1074 and without waste vegetable oil (WVO) based fatty acids. A second fluid ("Fluid 2") was formulated with WVO-based fatty acids and without Priamine 1074. A third fluid was formulated with a combination of WVO-based fatty acids and Priamine 1074. The three fluid formulations are shown in Table 1 with component amounts expressed in barrels (bbl) or pounds-per-barrel (ppb) and mixing time in minutes (min):

TABLE 1

EXAMPLE ORGANOCLAY-FREE DRILLING FLUID FORMULATIONS

| Formulation | Mixing Time, min | Fluid 1 | Fluid 2 | Fluid 3 |
|---|---|---|---|---|
| Safra oil, bbl | | 150.3 | 150.3 | 150.3 |
| LE SUPERMUL ™, ppb | 5 | 10 | 10 | 10 |
| Lime, ppb | 5 | 1.5 | 1.5 | 1.5 |
| WVO-based fatty acid | 5 | — | 1.5 | 1.5 |
| ADAPTA ®, ppb | 5 | 2 | 2 | 2 |
| CaCl2, ppb | 5 | 29.6 | 29.6 | 29.6 |
| Water, ppb | | 85.3 | 85.3 | 85.3 |
| BAROID ®, ppb | 10 | 223.7 | 223.7 | 223.7 |
| PRIAMINE 1074 | 5 | 1.5 | — | 1.5 |

Each example organoclay-free invert emulsion fluid ("IEF") was hot rolled at a temperature of about 250° F. and a differential pressure of about 500 psi for a time period of 16 hours (h). The rheology of each fluid was tested using a FANN® Model 35 Viscometer, available from Fann Instrument Company of Houston, Tex., USA. Each fluid was also tested for gel strength and High Temperature High Pressure (HTHP) fluid loss as described infra.

The rheology of each fluid was characterized in terms of plastic viscosity (PV), yield point (YP), and LSYP (low shear yield point). As will be appreciated, the PV and YP are parameters from the Bingham plastic (BP) rheology model. The YP was determined by extrapolating the BP rheology model to a shear rate of zero to represent the stress required to move the fluid and may be expressed in units of lb/100 ft$^2$. The YP may indicate the cuttings carrying capacity of the IEF through the annulus (that is, the hole cleaning ability of the IEF) such that a greater YP implies a non-Newtonian fluid with better ability to carry away cuttings as compared to a fluid of similar density. Generally, YP values greater than about 15 lbf/100 ft$^2$ can be considered a threshold for drilling purposes for providing the ability to carry away cuttings. The PV represents the viscosity of a fluid when extrapolated to infinite shear rate. The PV may be expressed in units of centipoise (cP). The PV may indicate the type and concentration of the solids in the IEF and can be indicative of drilling speed, such that a lesser PV may indicate an ability to drill faster.

The PV and YP were calculated using 300 revolutions per minute (rpm) and 600 rpm shear rate readings on the FANN® Model 35 Viscometer according to Equations 1 and 2:

$$PV = (600 \text{ rpm reading}) - (300 \text{ rpm reading}) \tag{1}$$

$$YP = (300 \text{ rpm reading}) - PV \tag{2}$$

As will be appreciated, a value for yield stress may be indicated by the parameter $\tau_0$ ("Tau0" or "tau-zero"), a parameter from the Herschel Buckley (HB) rheology model. The yield stress may be determined by fitting the HB rheology model to a shear stress v. shear rate curve. The shear stress v. shear rate curve may be determined by plotting the dial readings against the corresponding rpm determined on the FANN® Model 35 Viscometer. The yield stress may be expressed in the same units as the YP (lb/100 ft$^2$). The yield stress may indicate the susceptibility of the invert emulsion fluid to barite sag: generally, a relatively large yield stress value can be expected to provide a better sag resistance, which is desirable for drilling purposes and corresponds to a sag-resistant invert emulsion fluid. The yield stress may be determined from the LSYP determined according to Equation 3:

$$LSYP = (2*(300 \text{ rpm reading})) - (600 \text{ rpm reading}) \qquad (3)$$

An LSYP equal to or greater than about 7 lb/100 ft² can be considered an acceptable threshold value for drilling purposes for minimizing barite sag. The results of the rheological and filtration testing of the three example organoclay-free invert emulation drilling fluid are shown in Table 2.

The gel strength of the example organoclay-free invert emulsion fluids was also measured according to the American Petroleum Institute (API) RP 13B-2, Section 6.3. A sample of each of example organoclay-free invert emulsion fluid was placed in the viscometer for testing as described previously. The example organoclay-free invert emulsion fluid was stirred at 600 rpm for ten seconds and the sample was allowed to stand undisturbed for ten seconds. The hand-wheel of the viscometer was turned slowly and steadily to produce a positive dial reading and the maximum reading thus obtained was recorded as the initial gel strength (10-second gel) in pound force per hundred square feet. The sample was re-stirred at 600 rpm for ten seconds and then allowed to stand undisturbed for ten minutes. The measurements were repeated and the maximum reading was recorded as the ten-minute gel strength in pound force per hundred square feet. The gel strengths for the example organoclay-free invert emulsion fluids s are shown in Table 2.

The HTHP fluid loss was measured according to the API RP 13B-2, Section 7.2. The HTHP fluid loss test measures static filtration behavior of drilling fluid at elevated temperatures, such as 250° F. The test was conducted using a HTHP filter press unit containing a filter cell, a pressurized gas source, a heating system, a high-pressure filtrate collection vessel (maintained at proper back-pressure), and a filter medium. A sample of an example organoclay-free invert emulsion fluid was stirred for five minutes using a field mixer and then poured into the filter cell, leaving at least 2.5 centimeters of space in the cell to allow for fluid expansion. The filter paper was installed in the cell and the filter cell was assembled with both top and bottom valves closed. The filter cell was placed inside the HTHP filter press unit with appropriate connections to the high-pressure filtrate collection vessel and the regulated pressurized gas source. The temperature of the drilling fluid sample inside the filter cell was maintained at the test temperature of 250° F. A pressure of about 100 pounds per square inch (psi) was maintained until the test temperature of 250° F. was reached. The pressure of the drilling fluid sample inside the filter cell was increased to the test pressure of 500 psi and the timer for the filtration process was started. The filtrate was collected in the filtrate collection vessel for thirty minutes, and the volume of the filtrate was measured in milliliters (ml) using a graduated cylinder. The filtrate volume was corrected to a filter area of 45.8 square centimeters (cm²). HTHP filter cells usually have half the standard filter area, or 22.58 cm²; thus, the observed volume was doubled when recorded. The HTHP fluid loss measurements are shown in Table 2:

TABLE 2

RHEOLOGICAL TESTING RESULTS FOR EXAMPLE FLUID FORMULATIONS

| Rheological properties | Fluid 1 | Fluid 2 | Fluid 3 |
|---|---|---|---|
| 600 rpm viscosity (cP) | 34 | 86 | 130 |
| 300 rpm viscosity (cP) | 20 | 49 | 90 |
| 200 rpm viscosity (cP) | 14 | 37 | 74 |
| 100 rpm viscosity (cP) | 9 | 24 | 55 |
| 6 rpm viscosity (cP) | 1 | 6 | 26 |
| 3 rpm viscosity (cP) | 1 | 5 | 24 |
| PV (cP) | 14 | 37 | 40 |
| YP (lb/100 ft²) | 6 | 12 | 50 |
| LSYP (lb/100 ft²) | 1 | 4 | 22 |
| Initial gel strength (10 seconds) | 1.9 | 5 | 27 |
| Gel strength (10 minutes) | 2.6 | 5 | 28 |
| HTHP fluid loss (ml at 250° F.) | 2 | 2.2 | 1.4 |

Figure 3:
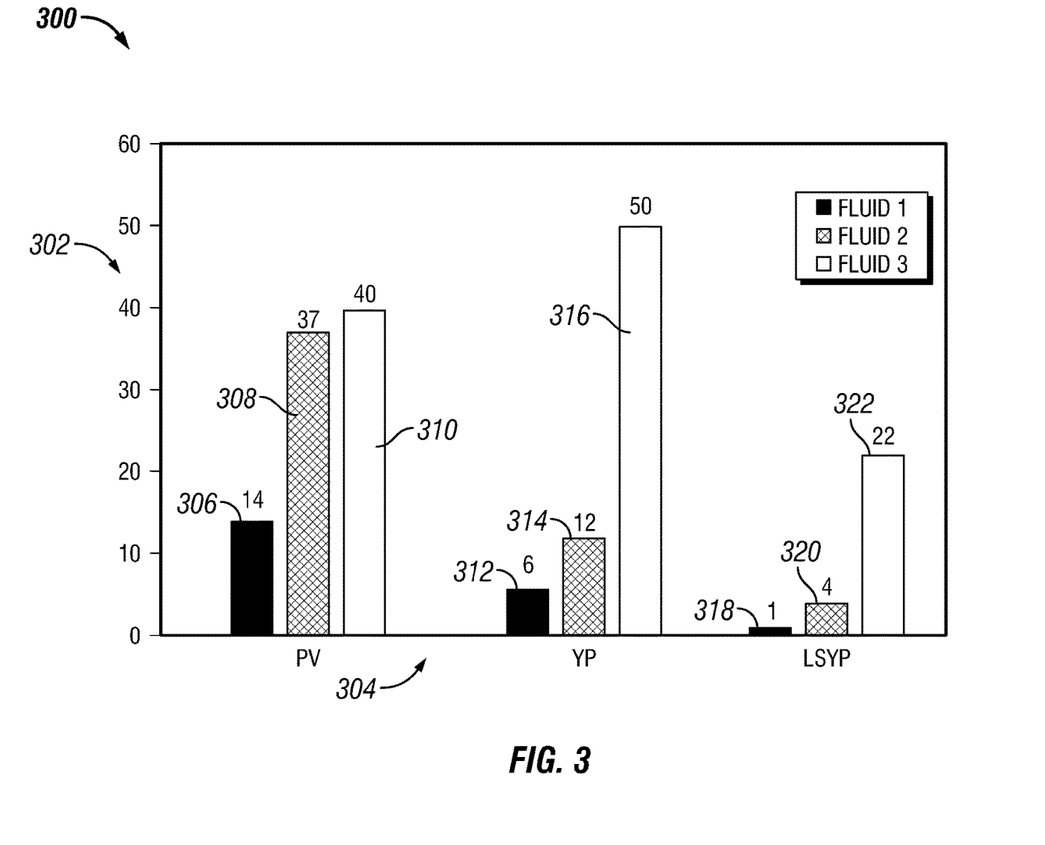
FIG. 3 is a bar graph depicting the plastic viscosity (PV), yield point (YP), and low shear yield point (LSYP) for example organoclay-free invert emulsion fluid formulations in accordance with an embodiment of the disclosure.

FIG. 3 is bar graph 300 depicting the PV, YP, and LSYP for each of the example fluid formulations in accordance with an embodiment of the disclosure. As shown in FIG. 3, the bar graph 300 depicts values on the y-axis 302 and each fluid and rheological property on the x-axis 304. The PV, YP, and LSYP for Fluid 1 are depicted by bars 306, 312, and 318 respectively. The PV, YP, and LSYP for Fluid 2 are depicted by bars 308, 314, and 320 respectively. Finally, the PV, YP, and LSYP for Fluid 3 are depicted by bars 310, 316, and 322 respectively.

As shown in Table 2 and FIG. 3, Fluid 3 having a combination of WVO-based fatty acids and a fatty dimer diamine exhibited a significant improvement in rheological properties as compared to Fluid 1 and Fluid 2. The PV of Fluid 3 increased by only 8% as compared to Fluid 2, whereas the YP and LSYP increased by 317% and 450%, respectively. The differences of Fluid 3 versus Fluid 1 are even greater. These results show that Fluid 3 exhibited a significant increase in YP and LSYP as compared to Fluids 1 and 2 while having a relatively minor increase in PV. Thus, the testing demonstrates that Fluid 3 with a greater YP and LSYP would ensure superior hole cleaning and cuttings carrying capacity as compared to Fluids 1 and 2.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. An invert emulsion drilling fluid, comprising
a water in oil emulsion;
an invert emulsifier to stabilize the water in oil emulsion in an amount operable to stabilize the water in oil emulsion;
a fatty amine having six to thirty six carbons;
a fatty acid having six to eighteen carbons, the fatty acid produced by:
   esterifying a waste vegetable oil to produce a methyl ester of the waste vegetable oil; and
   cleaving an ester group from the methyl ester of the waste vegetable oil, wherein the invert emulsion drilling fluid has a plastic viscosity in the range of greater than 37 centipoise (cP) to 40 cP, a yield point in the range of greater than 12 pounds/100 feet squared (lb/100 ft$^2$) to 50 lb/100 ft$^2$, a low shear yield point in the range of greater than 4 lb/100 ft$^2$ to 22 lb/100 ft$^2$.

2. The invert emulsion drilling fluid of claim 1, comprising a filtration control agent, lime, calcium chloride, and barite.

3. The invert emulsion drilling fluid of claim 2, consisting of:
the water in oil emulsion;
the invert emulsifier to stabilize the water in oil emulsion in an amount operable to stabilize the water in oil emulsion;
the fatty amine having six to thirty six carbons;
the fatty acid having six to eighteen carbons;
a filtration control agent;
lime;
calcium chloride; and
barite.

4. The invert emulsion drilling fluid of claim 2, wherein the filtration control agent is an amount in the range of 0.1 pounds-per-barrel (ppb) to 15 ppb.

5. The invert emulsion drilling fluid of claim 2, wherein the lime is an amount in the range of 0.1 pounds-per-barrel (ppb) to 20 ppb.

6. The invert emulsion drilling fluid of claim 2, wherein the calcium chloride is an amount in the range of 0.1 pounds-per-barrel (ppb) to 300 ppb.

7. The invert emulsion drilling fluid of claim 2, wherein the barite is an amount in the range of 0.1 pounds-per-barrel (ppb) to 800 ppb.

8. The invert emulsion drilling fluid of claim 1, wherein the invert emulsion drilling fluid has a mud weight in the range of 65 pounds-per-cubic foot to 160 pcf.

9. The invert emulsion drilling fluid of claim 1, wherein the fatty amine comprises a C36 fatty dimer diamine.

10. The invert emulsion drilling fluid of claim 1, wherein the fatty acid having six to eighteen carbons comprises a mixture of saturated fatty acids and unsaturated fatty acids.

11. The invert emulsion drilling fluid of claim 1, wherein the invert emulsion drilling fluid does not include clay.

12. The invert emulsion drilling fluid of claim 1, wherein the invert emulsion drilling fluid has an oil to water ratio (OWR) in the range of 50:50 to 90:10.

13. The invert emulsion drilling fluid of claim 1, where the oil is selected from the group consisting of mineral oil, diesel fuel, and synthetic oil, and combinations thereof.

14. The invert emulsion drilling fluid of claim 1, wherein the fatty amine having six to thirty six carbons is an amount in the range of 0.1 pounds-per-barrel (ppb) to 30 ppb.

15. The invert emulsion drilling fluid of claim 1, wherein the fatty acid having six to eighteen carbons is an amount in the range of 0.1 pounds-per-barrel (ppb) to 30 ppb.

16. The invert emulsion drilling fluid of claim 1, wherein the invert emulsifier is an amount in the range of 0.1 pounds-per-barrel (ppb) to 30 ppb.

* * * * *